United States Patent [19]

Kovacina et al.

[11] Patent Number: 4,535,011

[45] Date of Patent: Aug. 13, 1985

[54] MONO (PENTAFLUOROSULFUR DIACETYLENE, POLYMER THEREFROM, AND PREPARATIONS THEREOF

[75] Inventors: Thomas A. Kovacina, McConnellsburg, Pa.; Ronald A. DeMarco, Fairfax; Arthur W. Snow, Alexandria, both of Va.

[73] Assignee: The United States of America as represented by the Secretary of the Navy, Washington, D.C.

[21] Appl. No.: 562,251

[22] Filed: Dec. 16, 1983

[51] Int. Cl.$^3$ .................... C23C 11/00; C08F 12/30; C08F 112/30; C08F 212/18

[52] U.S. Cl. .................... 427/255.6; 427/372.2; 427/385.5; 526/243; 526/285

[58] Field of Search ............... 427/255.6, 372.2, 385.5; 526/243

[56] References Cited

U.S. PATENT DOCUMENTS 3,457,156  7/1969  Fisher .................... 526/285
3,822,134  7/1974  Rosch et al. .................... 427/255.6

OTHER PUBLICATIONS

Journal of Fluorine Chemistry, vol. 21, No. 2, Oct. 1982.

Norris, W. P. and Finnegan, W. G., J. Org. Chem. 1966, 31, 3292.

Bruce, M. I. and Cullen, W. R. Fluorine Chemistry Reviews 1969, 4–79.

*Primary Examiner*—Joseph L. Schofer
*Assistant Examiner*—Peter F. Kulkosky
*Attorney, Agent, or Firm*—Robert F. Beers; William T. Ellis; Thomas E. McDonnell

[57] ABSTRACT

A single substitution of pentafluorosulfur on diacetylene by a reaction of diacetylene with pentafluorosulfur bromine, followed by a dehydrobromination with potassium hydroxide. The substituted diacetylene polymerizes in the liquid and gas phases. The polymer is useful as a coating and surface treatment.

2 Claims, No Drawings

MONO (PENTAFLUOROSULFUR DIACETYLENE, POLYMER THEREFROM, AND PREPARATIONS THEREOF

BACKGROUND OF THE INVENTION

The invention pertains generally to fluoro-substitution of unsaturated compounds and in particular to mono fluorosubstitution of acetylene compounds.

The substitution of hydrogen by fluorine in organic molecules influences various properties and stabilize many molecular structures. Improvement of oxidative, thermal, and hydrolytic properties of such partially or totally fluorinated materials is well documented.

Fluorination of highly reactive unsaturated compounds, e.g. acetylenes, is very difficult to control. Acetylenic and diacetylenic compounds polymerize spontaneously at room temperature and below, and as a result, stabilized monomer compounds of such fluorinated derivatives are not readily attainable in yields considered to be practical.

No direct methods to prepare mono- or disubstituted derivatives are known. Indirect methods involving multistepped coupling reactions of the acetylenic fragments have been used to prepare symmetrical derivatives of diacetylene. Examples of fluorinated diacetylene prepared in this manner are disclosed in Norris, W. P. and Finnegan, W. G. *J. Org. Chem.* 1966, 31, 3292 and Bruce, M. I. and Cullen, W. R. *Fluorine Chemistry Reviews* 1969, 4, 79. These methods have many steps and yield mixtures of coupled products.

SUMMARY OF THE INVENTION

It is, therefore, an object of this invention to improve the oxidative, thermal, and hydrolytic properties of diacetylene compounds.

Another object of this invention is to substitute a perfluoro group, in a controlled manner, on diacetylene compounds to produce monomers capable of polymerizing to fluorinated unsaturated polymers.

A further object of this invention is to prepare fluorinated unsaturated polymers.

These and other objects are achieved by a controlled substitution of a single sulfur pentfluoro bromide on diacetylene followed by a dehydrobromnation of the substitued diacetylene with potassium hydroxide. Polymerization can proceed in the liquid or gas phase.

DETAILED DESCRIPTION OF THE INVENTION

The controlled substitution of a single pentafluorosulfur group ($SF_5$) for a terminal hydrogen of diacetylene is achieved by the following reaction sequence:

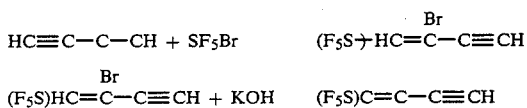

For the first step, the reactants are admitted into a reactor as liquids at a temperature not higher than about $-70$ degrees C. The temperature limitation arise, because of the instability of the reactants. Sulfur pentafluoro bromide decomposes at temperatures above $-70$ degrees C. in glass or nonglass metal surface unless additional precautions are taken, such as the one described later. Decomposition causes unwanted bromination of unsaturated bonds, thereby reducing the yield. Diacetylene violently polymerizes at temperatures higher than $-30$ degrees C. Accordingly, the reaction is done at a temperature from about $-100$ to $-70$ degrees C. and preferably from $-80$ to $-70$ degrees C. The reactor is preferably closed due to the volatility of the reactants and products.

The reaction temperature can be raised, if sulfur pentafluoro bromide is stabilized. It has been determined that purging the reactor with fluorine gas at a temperature of at least about 90 degrees C. preferably from about 90 degrees C. to about 130 degrees C., and most preferably from 100 degrees C. to 125 degrees C. for at least about 30 minutes and preferably at least one hour. Purges longer than 1½ hours are not preferred because the longer purge time does not result in any improvement. If a fluorine purge is used in order to obtain a higher reaction temperature, the reactor and associated equipment should be constructed from material which is inert to fluorine, e.g. stainless steel.

The higher temperature range is from about $-70$ to about $-30$ degrees C. and preferably from $-60$ to $-40$ degrees C. The two reactants can be mixed in a stoichiometric $SF_5Br:C_4H_2$ mole ratio of 1:1, but preferably with an excess of up to 15 mole percent of sulfur pentafluoride bromide, and most preferably with an excess from 7 to 12 mole percent of the bromide reactant.

After the reaction is complete, it is preferred that the adduct intermediate is separated from the reactor. The preferred separation technique is cryogenic fractional distillation at a temperature from about $-70$ to about $-40$ degrees C. and preferably from $-65$ to $-60$ degrees C.

The final step is dehydrobromination of the adduct with potassium hydroxide. The reaction requires an extremely strong base, thus potassium hydroxide is added dry. The rate of addition must be such that the exothermic dehydrobromination reaction does not cause the reaction mixture to exceed 30 degrees C. and preferably 25 degrees C. It is possible to carry out the dehydrobromination at a temperature as low as 10 degrees C. Preferably the temperature is from 20 to 25 degrees C. In order to ensure that dehydrobromination is complete, an excess of potassium hydroxide is used. The preferred excess is from 25 to 100 mole percent of stoichiometry. Mono(pentafluorosulfur)diacetylene can be isolated by any of the standard techniques, e.g. fractional distillation, so long as the temperature does not exceed 25 degrees C. and preferably 0 degrees C. and is not lower than $-40$ degrees C.

EXAMPLE I

Preparation of $SF_5C_4H$

Millimole quantities of $SF_5Br$ and $HC\equiv C-C\equiv CH$, in a $SF_5Br-H_2C_4$ mole ratio of 1.1:1.0 $HC\equiv C-C\equiv CH$, were reacted overnight at $-78$ degrees C. in a one liter round bottom flask, fitted with a Teflon/Pyrex stopcock and a condensation trap, giving a 50 percent yield of the 1:1 addition product $F_5SC(H)=C(Br)-C\equiv CH$ (I). This compound was a clear liquid with a vapor pressure of less than 5 torr at room temperature and was isolated by vacuum distillation through a 0° trap into a collection trap cooled at $-23°$ C. The gas phase infrared spectrum contained principal absorptions at 3325 cm$^{-1}$ (m) ($\nu(HC\equiv C)$), 3110 cm$^{-1}$ (w) ($\nu(HC=C)$), 2120 cm$^{-1}$ (w) ($\nu(C\equiv C)$), 1620 cm$^{-1}$ (w) with a shoulder at 1590 cm$^{-1}$ ($\nu(C=C)$), 880 cm$^{-1}$ (vs) ($\nu$(S—F)), and 603 cm$^{-1}$ (m) ($\delta$(S—F)). Other absorptions at 1295 cm$^{-1}$ (w), 1008 cm$^{-1}$ (m), 920 cm$^{-1}$ (m), 720 cm$^{-1}$ (w) and 657 cm$^{-1}$ (m) were unassigned. The $^{19}$F NMR spectrum in Freon-11 contained only one AB$_4$ pattern ($\delta_A = -61.0$ and $\delta_B = -71.5$ ppm, $J_{A-B} = 141.1$ Hz), which is consistent with an SF$_5$ group. The $^1$H NMR spectrum contained a quintet ($\delta = 7.45$ ppm, $J_{H-B} = 7.8$ Hz) due to a proton coupling withthe equatorial sulfur-fluorines and a singlet in the spectral region of acetylene hydrogens ($\delta = 3.88$ ppm) in a ratio of 1:1.07. The mass spectrum contained the appropriate Br clusters and the fragmentation pattern (reported for $^{79}$Br) contained a parent-ion at m/e 256, in addition to major fragments at 147 (SC$_3$Br+), 128 (C$_4$HBr+), 127 (SF$_5$+), 89 (SF$_3$+) and 70 (SF$_2$+).

Dehydrobromination of compound (I) by excess KOH occurred at 25° C. to give an approximate 50% yield of the mono(pentafluorosulfur)diacetylene, SF$_5$C≡C—C≡CH (II). This compound was isolated by using cryogenic fractional distillation at −63° C. The identity of the compound was confirmed by gas phase molecular weight measurements (found, 174; theory, 176) and spectroscopic data. In the gas phase infrared spectrum, a medium absorption at 3340 cm$^{-1}$ ($\nu$(HC)), a medium absorption at 2260 cm$^{-1}$ ($\nu$(SF$_5$C≡C)), a weak absorption at 2080 cm$^{-1}$ ($\nu$(HC≡C)), variable intensity absorptions at 1350, 1140, 1100 and 990 cm$^{-1}$ were unassigned, while very strong S-F bands were at 900, 850, 650, 620 and 590 cm$^{-1}$. The $^{19}$F NMR spectrum in Freon-11 contained only one AB$_4$ pattern. ($\delta_A = -70.0$ and $\delta_B = -78.1$ ppm; $J_{A-B} = 141.5$ Hz). The $^1$H NMR spectrum contained a singlet absorption at $\delta = 2.45$ ppm relative to TMS, which is within the range (2-3 ppm) characteristic of protons bonded to acetylenic structures. A relatively simple mass spectral fragmentation pattern contained a strong parent ion at m/e = 176, together with major fragments at 157 (SF$_4$C$_4$H+), 127 (SF$_5$+), 89 (SF$_3$+), 68 (SC$_3$+) and 49 (C$_4$H+). The experimentally determined vapor pressure equation, log P (mm) = 7.70 − (1593/T), yielded an extrapolated boiling point of 57.6°, $\Delta H_{vap}$ of 7.28 kcal/mol, and $\Delta S_{vap}$ of 22.0 eu. The density of the liquid at 25° C. was found to be 1.42 g/cc.

EXAMPLE II

Improved Stability of SF$_5$Br by Fluorine Purge

A stainless steel Hoke gas cylinder was filled with fluorine and heated at 120° C. for 45 minutes. The fluorine was removed and the cylinder was filled with sulfur pentafluro bromide. The filled cylinder was stored at room temperature for more than one year. To date, no decomposition of sulfur pentafluoro bromide has been detected.

Mono(pentafluorosulfur)diacetylone can polymerize into highly useful polymers; however, it should be noted that extreme care should be taken to prevent the monomer from polymerizing too quickly, causing an explosion. Further, the polymer in bulk should be handled carefully to prevent detonation. The pressure sensitivity of this polymer makes the polymer useful for small-explosive applications. The main use of the polymer, however, is the surface treatment of a wide range of materials. This polymer, due to its surprising adhesiveness and nonexplosiveness in thin films, can import fluoropolymer properties to a wide range of materials.

The monomer can be polymerized in the liquid phase by maintaining the temperature of the polymer from about 0 to 30 degrees C. and preferably from 15 to 25 degrees C. The preferred polymerization technique is to contact a surface to vapors of the monomer, causing the monomer to polymerize on the surfaces. Sufficient vapors can be generated by maintaining the monomer at a temperature from about −20 to 30 degrees C. and preferably from 0 to 20 degrees C., by placing the monomer in a vacuum, by admitting the liquid monomer into the chamber drop wise or as an aerosol, and by spraying the monomer on a heated surface. The polymer can be represented by the formula:

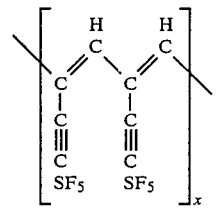

wherein x represents the average number of repeating units, and equals up to about 15. Values for x from 6 to 9 provide an excellent polymer which is easily obtained.

The following examples are given to illustrate the two techniques for polymerizing the subject monomer.

EXAMPLE III

Liquid Phase Polymerization

Approximately five millimoles of monomer was condensed into a 5 mm o.d. 15 mm long Pyrex NMR tube and the tube was sealed. The tube with the monomer was left overnight at about 22 degrees C. When the tube opened under vacuum, the monomer was completely polymerized.

Due to the insolubility of the polymer, characterizing this polymer was limited. The mass spectrum was not helpful to assign a molecular weight because the major fragments resulted from cleavage products of sulfur fluorides. VPO and NMR measurements were not conducted because a suitable solvent could not be found. The ESR spectrum consisted of a broad resonance having a g value of 2.0026, and a calculated spin density of $3 \times 10^{18}$ spins/gram or approximately 1 spin/1000 repeat units. Attempts to obtain an XPS spectrum of poly(SF$_5$C$_4$H) were unsuccessful due to decomposition of the sample during the analysis. The thermal stability of this polymer was determined by TGA as above and gave a 10 percent weight loss at 165 degrees C. and gradually continued until a 50 percent weight loss was observed at 405 degrees C. Analysis of the volatile products also indicated that SF$_5$ cleavage had occurred.

EXAMPLE IV

Vapor Phase Polymerization on Polymers

The vapor phase polymerizations onto polymer surfaces were conducted by placing samples of weighed, commercially available polymers into a 1 liter Pyrex flask equipped with a 12/30 standard taper joint and a stopcock. The polymer samples were then exposed to the monomer vapors for varying times, then removed from the vessel and weighed to determine the relative amount of polymerization on each samples as a function of time.

A series of 4 polymer samples were introduced into the reaction flask: 1. poly(tetrafluoroethylene) (PTFE), 2. poly(vinylidene fluoride) (PVF2), 3. poly(fluorinated ethylene propylene) (FEP), and 4. polyethylene (PE). The percentage weight gain after 10 days exposure was PTFE (51 percent), PE (11 percent), FEP (4 percent), and PVF2 (1 percent).

The infrared spectrum of poly($SF_5C_4H$) was obtained by double beam, subtrative techniques. The polymer on FEP was placed into the sample beam and a neat FEP film was placed in the reference beam. The resulting IR spectrum contained principal absorptions at 2230 (m, $\nu(C{\equiv}C)$), 1720 (w, $\nu(C{=}C)$), and 900 can$^{-1}$ (vs, 8($SF_4$)).

The effect of the subject polymer on the surface properties of other polymers was determined by measuring the critical surface tension of the neat host polymer and the host polymer with the subject polymer. The following example is given to illustrate this.

EXAMPLE V

Critical Surface Tension

The critical surface tension was measured using a series of n-alkanes with known surface tension values. The surface tension for the alkanes was plotted against the cosine of the measured contact angle. The critical surface tension is defined as the surface tension that corresponds to $\cos \theta = 1$, and this means that any liquid with a lower surface tension will completely wet the surface of the polymer. The critical surface tension (dyn/cm) for poly($SF_5C_4H$) on FEP was 26.8. In comparison to typical polymers, the wettability of the $SF_5$-containing polymers is much lower than PE (critical surface tension of 31.0) but higher than FEP or PTFE (critical surface tension of each is 18.0).

Increasing the wettability of especially PTFE is significant due to the corresponding increase in the capability of PTFE to adhere to surfaces. Decreasing the wettability of nonfluorinated polymers, e.g. polyethylene establishes that the vapor polymerization of the subject monomer is a simple technique to impart fluoropolymer properties to non-fluorinated polymers.

The present polymers can coat nonpolymers surfaces, e.g. glass. Example VI is given to illustrate that aspect of the present invention.

EXAMPLE VI

Coating Glass with (($SF_5)C_4)_x$ H

A round bottom glass flask was evacuated by vacuum and partially refilled with mono(pentafluorosulfur)diacetylene. The flask was kept at 22° C. for three days, turning the flask golden. Testin the coating showed that the coating had strongly adhered to the glass The ability of the subject polymer to coat glass and similar materials may provide a simple means and technique for passivating surfaces from, e.g. fluorine, fluorine-containing compounds, and reactions involving those materials.

As has been demonstrated, the placement of an $SF_5$ group on diacetylene provides a simple way of improving the stability of diacetylenes and of producing a fluorinated monomer capable altering a wide variety of surfaces by polymerizing thereon. The polymer coating produced by this monomer is especially important as a protective coating and a means for altering surface properties of a wide range of materials.

Obviously, many modification and variations of the present invention are possible in light of the above teachings. It is therefore to be understood that, within to scope of the appended claims, the invention may be practiced otherwise than as specifically described.

What is claimed is:

1. A method of coating poly mono(pentafluro sulfur)diacetylene on a surface which comprises maintaining mono(pentafluorosulfur)diacetylene at a temperature from about −20 to about 30 degrees C. to provide a gas and exposing said surface to said gas until sufficient mono (pentafluorosulfur)diacetylene has polymerized on said surface.

2. The method of claim 1 wherein said temperature is from 0 degrees C. to 20 degrees C.

* * * * *